United States Patent
Perry

(10) Patent No.: US 11,420,114 B2
(45) Date of Patent: Aug. 23, 2022

(54) SYSTEMS AND METHODS FOR ENABLING TIME-SHIFTED COACHING FOR CLOUD GAMING SYSTEMS

(71) Applicant: Sony Interactive Entertainment LLC, San Mateo, CA (US)

(72) Inventor: David Perry, Monarch Beach, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 200 days.

(21) Appl. No.: 14/987,669

(22) Filed: Jan. 4, 2016

(65) Prior Publication Data

US 2017/0087460 A1 Mar. 30, 2017

Related U.S. Application Data

(60) Provisional application No. 62/235,432, filed on Sep. 30, 2015.

(51) Int. Cl.
*A63F 13/00* (2014.01)
*A63F 13/35* (2014.01)
(Continued)

(52) U.S. Cl.
CPC .......... *A63F 13/35* (2014.09); *A63F 13/25* (2014.09); *A63F 13/335* (2014.09);
(Continued)

(58) Field of Classification Search
None
See application file for complete search history.

(56) References Cited

U.S. PATENT DOCUMENTS

2010/0035689 A1* 2/2010 Altshuler ............... A63F 13/46
463/39
2011/0107220 A1* 5/2011 Perlman ............... H04N 19/107
715/720
(Continued)

FOREIGN PATENT DOCUMENTS

WO WO 2012174299 A2 12/2012
WO WO-2017030844 A1 * 2/2017 ........... A63F 13/352

OTHER PUBLICATIONS

Hit Box; 2012; "Hot to Hit Box—TTT2 Wavedash"; https://www.youtube.com/watch?v=RGcgx9YqynQ.*
(Continued)

*Primary Examiner* — Tramar Harper
(74) *Attorney, Agent, or Firm* — Penilla IP, APC

(57) ABSTRACT

Systems and methods are provided for enabling users playing online games to create coaching videos of gameplay, and post such coaching videos to a cloud gaming system. In one example, coaching videos include a video clip of the gameplay and a video of the user, guiding and/or explaining how the game was played. A user playing the same game may desire coaching, and the cloud gaming system can identify previously posted coaching videos that correspond to the point in time or action in which the user requesting coaching is currently playing. The cloud system can access a database of coaching options, which are then presented to a user. The coaching options may be videos of gameplay and videos of the user providing coaching. The user can then view the coaching videos, rate them if desired, and then resume with his or her gameplay.

19 Claims, 8 Drawing Sheets

(51) Int. Cl.
*A63F 13/52* (2014.01)
*A63F 13/25* (2014.01)
*A63F 13/335* (2014.01)
*A63F 13/355* (2014.01)
*A63F 13/497* (2014.01)

(52) U.S. Cl.
CPC .......... *A63F 13/355* (2014.09); *A63F 13/497* (2014.09); *A63F 13/52* (2014.09)

(56) References Cited

U.S. PATENT DOCUMENTS

| | | | | |
|---|---|---|---|---|
| 2011/0223574 A1* | 9/2011 | Crawford | ................. | G09B 5/00 434/322 |
| 2012/0100916 A1* | 4/2012 | Zalewski | ................. | A63F 13/12 463/36 |
| 2012/0283021 A1* | 11/2012 | Riego | ................. | A63F 13/12 463/42 |
| 2012/0309523 A1* | 12/2012 | Yamashita | ................. | A63F 13/42 463/31 |
| 2013/0116022 A1* | 5/2013 | Davison | ................. | A63F 13/355 463/9 |
| 2013/0159375 A1* | 6/2013 | Perry | ................. | H04L 67/02 709/201 |
| 2013/0260896 A1* | 10/2013 | Miura | ................. | A63F 13/12 463/42 |
| 2014/0179412 A1* | 6/2014 | Seabolt | ................. | A63F 13/12 463/25 |
| 2014/0179424 A1* | 6/2014 | Perry | ................. | A63F 13/355 463/31 |
| 2014/0179426 A1* | 6/2014 | Perry | ................. | A63F 13/10 463/31 |
| 2014/0187314 A1* | 7/2014 | Perry | ................. | A63F 13/10 463/29 |
| 2014/0187315 A1* | 7/2014 | Perry | ................. | A63F 13/12 463/29 |
| 2014/0187318 A1* | 7/2014 | Gallizzi | ................. | A63F 13/355 463/31 |
| 2014/0220541 A1* | 8/2014 | Waldron | ................. | A63F 13/80 434/362 |
| 2014/0248960 A1* | 9/2014 | Zalewski | ................. | H04L 67/42 463/42 |
| 2014/0364228 A1* | 12/2014 | Rimon | ................. | A63F 13/12 463/32 |
| 2015/0314201 A1* | 11/2015 | Wickenkamp | ........ | H04N 21/00 463/31 |
| 2016/0042654 A1* | 2/2016 | Fieldman | ................. | G09B 7/00 434/219 |
| 2016/0184712 A1* | 6/2016 | Colenbrander | ........ | A63F 13/79 463/29 |
| 2016/0287987 A1* | 10/2016 | Onda | ................. | A63F 13/86 |
| 2016/0361646 A1* | 12/2016 | Perry | ................. | A63F 13/355 |
| 2017/0087475 A1* | 3/2017 | Perry | ................. | A63F 13/25 |
| 2017/0087476 A1* | 3/2017 | Perry | ................. | A63F 13/53 |
| 2017/0345215 A1* | 11/2017 | Khedkar | ................. | G06F 3/011 |
| 2021/0056603 A1* | 2/2021 | Vidal | ................. | A63F 13/493 |

OTHER PUBLICATIONS

Super Mario Bros; Oct. 28, 2013; https://www.youtube.com/watch?v=IzvgMS7caNI (Year: 2013).*

International Search Report and Written Opinion from PCT/US2016/052497, dated Dec. 15, 2016.

* cited by examiner

SYSTEMS AND METHODS FOR ENABLING TIME-SHIFTED COACHING FOR CLOUD GAMING SYSTEMS

CLAIM OF PRIORITY

This application claims priority to U.S. Provisional Patent Application No. 62/235,432, entitled "Systems and Methods for Enabling Time-Shifted Coaching for Cloud Gaming Systems," filed on Sep. 30, 2015, which is herein incorporated by reference.

FIELD OF THE DISCLOSURE

The present disclosure relates to systems and methods for enabling access to coaching from other players and posting of coaching videos in association with particular games played via cloud gaming system.

BACKGROUND

Cloud systems deliver services over a network (typically the Internet) using computing resources (hardware and software). The services, in the context of gaming, enable streaming of content to remote clients, wherein most processing is done on servers, which may be distributed. Input provided at the remote clients will in turn drive execution of the game on the servers, without the need for dedicated gaming hardware at the client's location. Due to the ease of accessing the games executing on the cloud systems, cloud gaming has been increasing in popularity because users find it easier to access more titles without complex hardware restrictions. Similarly, game suppliers find it easier to manage game code from centralized locations.

One benefit of cloud gaming is the ability to access a large number of games. As a result, players with little experience playing certain games may try them and give up play before reaching their full potential. Currently, users wishing to learn more about a game may resort to searching online video posts, where some users may guide others regarding tricks, process, and/or techniques for advancing in the games. Although such videos may be useful, the place in game play that relate to the posted videos may not relate to where a user desires training or information. As a result, users are forced to search and search video posts by others to see if they can find a post that relates to the place in the game that the user is interested in learning. Consequently, prior video posts are not very efficient in helping users that wish information regarding specific game levels, game actions, game events and/or places in interactivity.

It is in this context that embodiments of the disclosure arise.

SUMMARY

Embodiments of the present disclosure relate to systems and methods for enabling users playing online games to create coaching videos of gameplay, and post such coaching videos to a cloud gaming system. In one embodiment, coaching videos include a video clip of the gameplay and a video of the user, guiding and/or explaining how the game was played. A user playing the same game may desire coaching, and the cloud gaming system can identify previously posted coaching videos that correspond to the point in time or action in which the user requesting coaching is currently playing. In one embodiment, a user playing a game may decide to pause gameplay and request coaching. The cloud system can access a database of coaching options, which are then presented to the user. In one embodiment, the coaching options are videos of gameplay and videos of the user providing coaching (e.g., for a select point). The user can then view the coaching videos, and then resume with his or her gameplay. In some embodiments, the coaching videos can be superimposed (e.g., overlaid) and played simultaneously as the user plays the game. In other examples, the coaching video can be played in a side-window simultaneously as the user plays the game. As the user plays the game, the coaching video advances as well, providing the user with coaching as the activity progresses. In some embodiments, several options of coaching videos are provided, and users may rate the best or more interesting coaching videos. The ratings can then be used by the system to show certain coaching videos in a filtered order. Thus, the coaching videos represent user generated content (UGC), which is dynamically posted and associated to select gameplay timestamps or game actions or game stages. As the coaching is indexed to specific gameplay, it is possible to present dynamically relevant coaching videos back to users during their own gameplay. This avoids the drawback with separately searching for online posted videos that are not associated in any way with the user's gameplay state or time. Several inventive embodiments of the present disclosure are described below.

In one embodiment, a method for enabling generation coaching videos for games that are streamed to clients from a cloud gaming system is provided. The method includes executing gameplay of a game at a server of the cloud gaming system. The execution of the gameplay is directed from a client device that is connected to the server. The gameplay is therefore directed from the client device, and the execution of the gameplay includes streaming video and audio to the client device for presentation on the client. The method further enables a coaching mode. The coaching mode when activated starts to record the gameplay at the server and capture of a video of a user at the client. The captured video of the user is received by the server and saved at the server to create a coaching video. The method further generates a timestamp that identifies a place (e.g., index) in content interactivity in the game, for which the recorded gameplay and the coaching video is related. The recorded gameplay and the coaching video will, in one example, define a coaching session. The method further enables posting of the coaching session to a coach database. The coach database is accessible by the server when another user requests coaching assistance for a game. The coaching assistance acts to identify one or more coaching sessions for a select point in gameplay for the game (e.g., for the user requesting coaching, while participating in online game play).

In another embodiment, a method for operating gaming operations via a cloud gaming system is provided. The method includes enabling gameplay of a game to a user that is registered to play games via the cloud gaming system. The cloud gaming system is configured to execute the game on a server of the cloud gaming system in response to input control received from a client device of the user. The client device of the user has an internet connection to the server of the cloud gaming system and the server of the cloud gaming system is configured to send a stream of audio and video in response to execution of the game. The audio and video stream is rendered on a screen associated with the client device. The method further includes receiving a request to trigger a coaching mode from the client device. The request is associated with a select point in the game. The method includes pausing the gameplay of the game and accessing a coach database. The access to the coach database includes a request for coaching sessions for the game in association with the select point in the game. The method further includes presenting coach options to the display screen of the client device. The coach options include one or more coaching sessions that relate to the select point in the game. Then, causing rendering of one of the coaching sessions on the display screen of the user. The coaching session includes a recorded gameplay and a coaching video from a user that created the coaching session. The method further enables resume of gameplay of the game after rendering of the coaching session.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

DETAILED DESCRIPTION

The following embodiments describe systems and methods for enabling users playing online games to create coaching videos of gameplay, and post such coaching videos to a cloud gaming system. In one embodiment, coaching videos include a video clip of the gameplay and a video of the user, guiding and/or explaining how the game was or is played. For example, as games get played over time, various users will decide to post coaching videos for different portions of the video game. In one configuration, the coaching videos are indexed to a timestamp of play. The timestamp can include not only time, but also metadata that identifies where in the video game session, action and/or scene the coaching video was generated. In this manner, later users desiring coaching for a particular part of the video game can simply request coaching, and the system will automatically identify one or more coaching videos that may apply to the state in which the user is playing or desires to play. In one configuration, a plurality of coaching videos may be found, which may touch upon the stage or state in the game that the user is in (i.e., the coach requester). This list can be shown to the user on a webpage, a screen icon, a window, or overlaid, which can optionally include details regarding ratings. For instance, if a certain player posts good coaching videos, users that use or watch the coaching videos can rate them. The rating can then be used to order or recommend certain coaching videos to players. In one configuration, the coaching videos are considered time-shifted, as the coaching videos are not live videos, but are selected to sync substantially to the point in time or action of the video game being played.

The gameplay, in one embodiment, is through a cloud based processing system that enables streaming of online gameplay, while allowing users to provide interactive input from remote locations that are connected to the internet. While the users play the game, users can choose to record gameplay. The recorded gameplay can be used to produce a video.

It will be obvious, however, to one skilled in the art, that the present disclosure may be practiced without some or all of these specific details. In other instances, well known process operations have not been described in detail in order not to unnecessarily obscure the present disclosure. With the above general understanding of the various embodiments, example details of the embodiments will now be described with reference to the various drawings.

Figure 1:
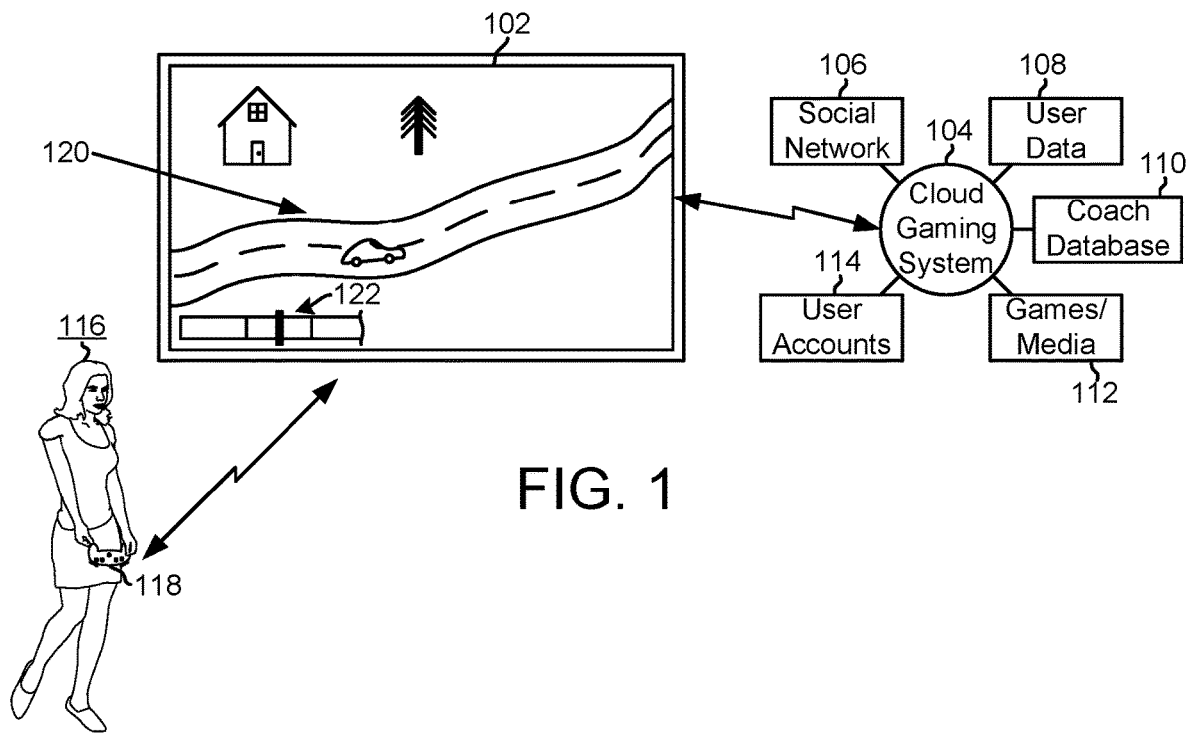
FIG. 1 illustrates an example of a user interfacing with a display screen to play a video game using a controller, and in some embodiments, the display device can be a computer, a tablet, a smart device, a personal computer (PC), a console, and the controller can be any input device.

FIG. 1 illustrates an example of a user 116 interfacing with a display screen 102 to play a video game using a controller 118. The video game being executed will present game content 120 on the display screen 102. The display screen 102, in one embodiment, is connected to the Internet and is provided with access to a cloud gaming system 104. The cloud gaming system 104 can be directly connected to the display screen 102, or to another computing device. Other computing devices can include a personal computer (PC), a game console, a portable device, or other computing device. The cloud gaming system 104 may be interfaced with a social network 106, which can provide access to information regarding friends of specific users, such as user 116.

In some embodiments, the cloud gaming system 104 will have its own social network that identifies players that have access to the cloud gaming system, associated friends, preferences, games played, trophies, and other game related data and metadata. In some embodiments, the cloud gaming system can also be interfaced with user data 108. User data 108 can include various types of data, such as gameplay data, points achieved in various games, trophies, rankings, saved states, levels achieved, and other personal achievements and data related to the user's activity in regard to one or more games. The cloud gaming system 104 can also be interfaced with user accounts 114, which allows management of various user accounts for the users that can access the cloud gaming system 104.

The user accounts can store profile information, billing information, privileges, and other user identifying data. Still further, the cloud gaming system 104 can also be interfaced with games and media 112. The games and media 112 can include a plurality of data stores for storing the different game titles and associated executable code. In some embodiments, the games can be stored in various storage systems of a data center, and can then be launched or started when specific users request access to one or more games. In one configuration, the cloud gaming system 104 can also be interfaced with a coach database 110. As mentioned above, coaching videos can be created by users that are accessing and playing certain games. In one configuration, the coaching videos can include recorded gameplay videos and also a coach video.

The recorded gameplay video is a recording of the gameplay that was played by the user that decided to create a coaching video. The coach video can be, in one embodiment, a video of the coach (user that created the coaching video) discussing and teaching what moves are being made in the recorded gameplay. The teaching can include strategy associated with specific gameplay, controller inputs that should be made for specific gameplay, tricks for achieving higher points in specific levels, maneuvers associated with specific game content, and other audio or text comments to assist the user viewing the coaching video. In one embodiment, the coaching video can include close-up video or images of the controller and inputs made to control interactivity. These video images can assist the user to see what and how controller inputs, button pushes, presses, simultaneous presses, motions, gestures, etc., should be made to achieve a specific input while playing the game. In some embodiments, the inputs can be via touch screens. In other embodiments, the inputs can be made via touch screens and buttons or combinations thereof. Thus, the coaching video and the recorded gameplay's can be stored in the coach database 110. As will be discussed below, the coaching videos are preferably indexed to specific game timestamps.

The timestamps should be generically understood to include metadata that identifies an approximate point in time in the game that the coaching video will relate to. For example, the metadata can include time information, but may also include specific level information, stage in the game, interactive play content, or other identifying information that can link the coaching video to a specific point or action in the video game. By providing a timestamp link to the point in time when the coaching video was created, later requests to view coaching videos can be served to users with relevancy to where the user is requesting help or coaching. In the example shown in FIG. 1, the user 116 may select an input via controller 118 that could display a graphical indicator 122. The graphical indicator 122 can include identifying information as to where the user is in the gameplay. Thus, if the user desires coaching information or guidance, the cloud gaming system can identify the point in time when the users are requesting the coaching and/or assistance, and a search of the coach database 110 can be made to identify relevant coaching videos.

Figure 2:
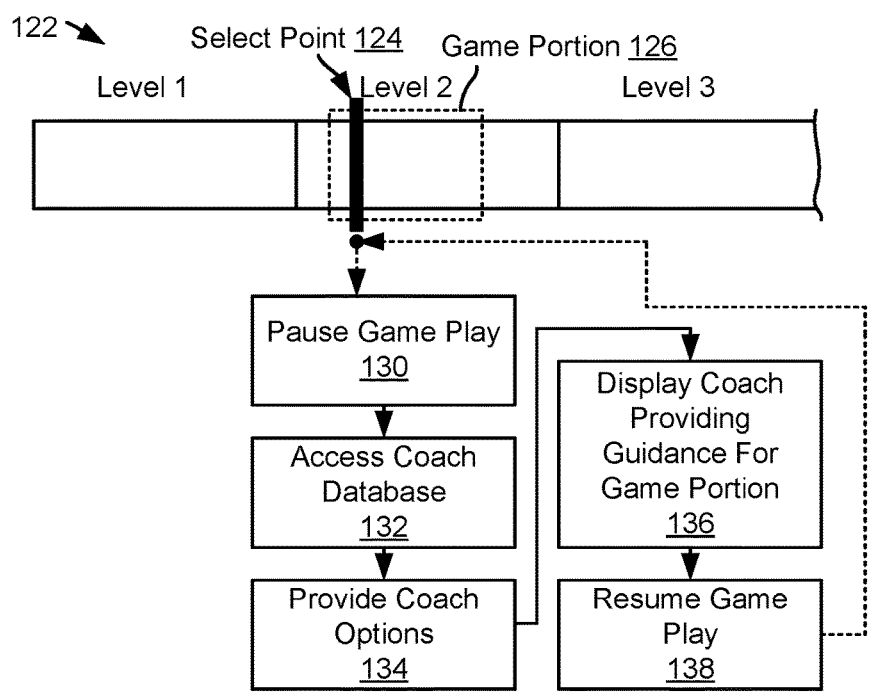
FIG. 2 illustrates an example of the graphical indicator, which may identify different levels in the game being played by user.

FIG. 2 illustrates an example of the graphical indicator 122, which may identify different levels in the game being played by user 116. As shown for example purposes only, the user is shown to be playing level two, and a selector can identify when a selector 124 is chosen by the user to pause the game. For instance, user 116 was playing game content 120 of FIG. 1, e.g. driving a car through a winding road. The user is desiring coaching at this stage, such as to illustrate better ways of traversing the winding road. In operation 130, the user may pause the gameplay. Pausing gameplay can be performed using controller inputs, voice inputs, or selection of GUIs on the display screen. In this configuration, the pausing of the game 130 is intended to cause the access of a coach database 132, by the cloud gaming system 104.

Figure 6:
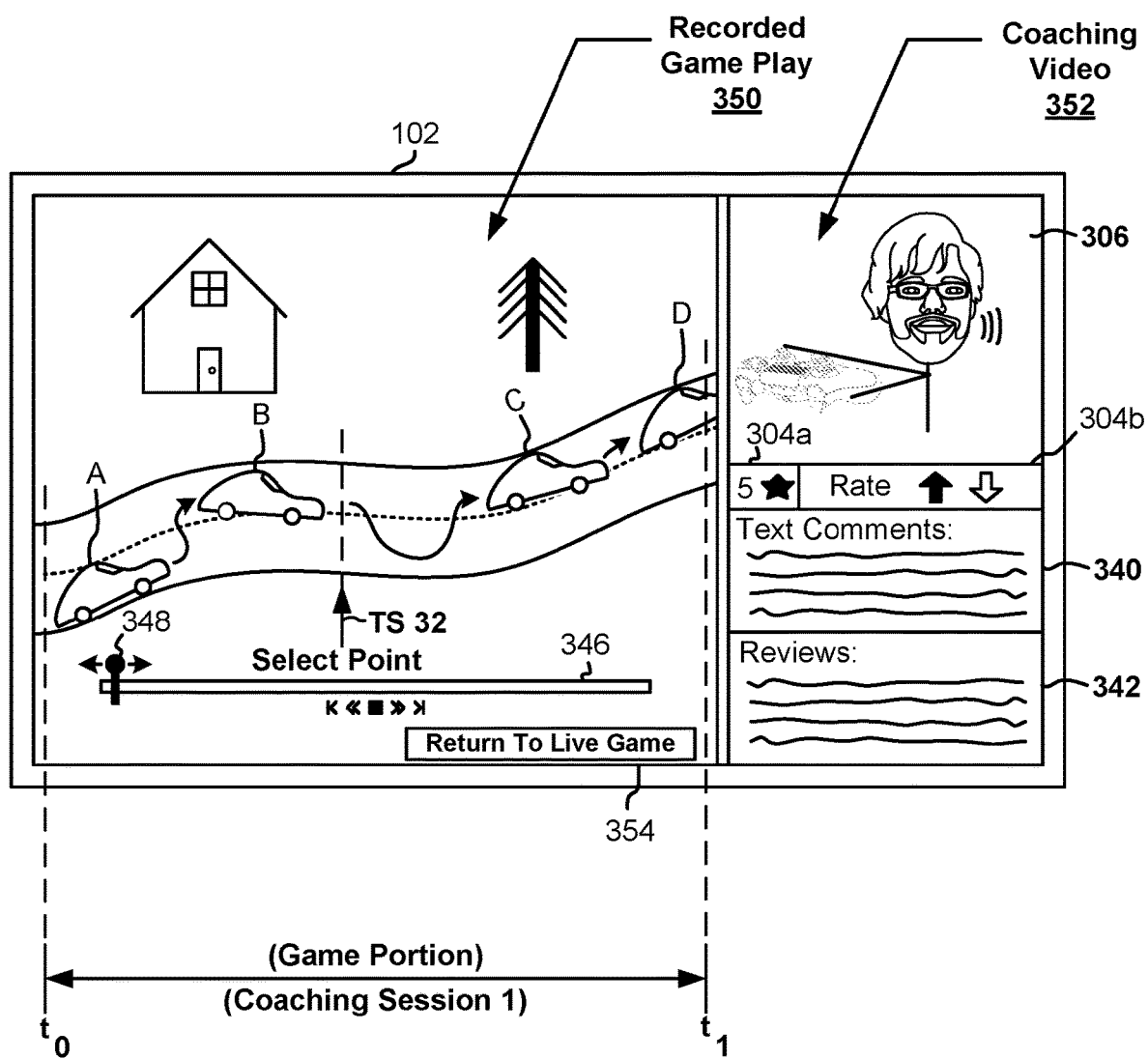
FIG. 6 illustrates an example of a recorded gameplay and a coaching video illustrated in screen.

In operation 134, coaching options are provided by the cloud gaming system 104 and then displayed in operation 136. The display of the coaching options can include displaying various coaches that can provide guidance for the game portion 126. When the user selects a specific coaching video, the coaching video can appear on the display screen 102, as shown in FIG. 6 below. The user can then watch the coaching video and once the video is done playing or the user has replayed the video any number of times, the user can resume gameplay 138. The resuming of gameplay can then bring the user back to the select point 124 or can rewind the gameplay any amount of time so as to acclimate the user back into a gameplay mode.

Figure 3:
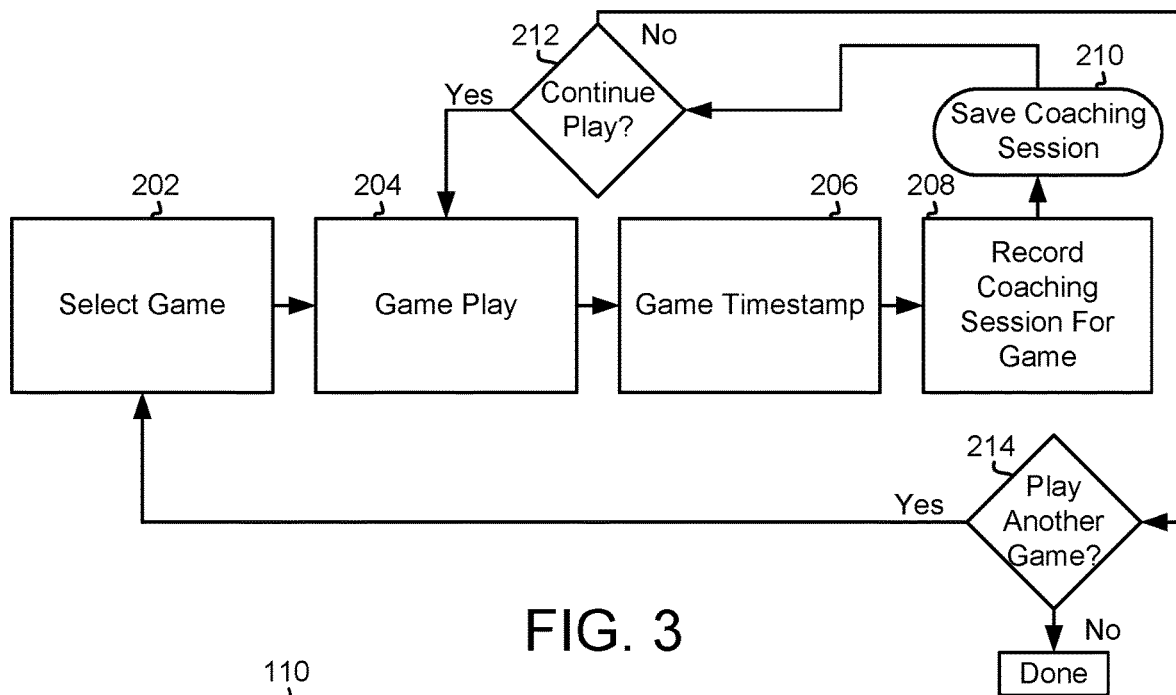
FIG. 3 illustrates a flow diagram depicting example operations that can be performed by game players in order to record a coaching session for a game, in accordance with one embodiment of the disclosure.

FIG. 3 illustrates a flow diagram depicting example operations that can be performed by game players in order to record a coaching session for a game, in accordance with one embodiment of the disclosure. As shown, a user may select a game in operation 202, from among a plurality of games offered for online gameplay by the cloud gaming system 104. In one embodiment, the selected game can be one that was purchased by the user, or has been played by the user, or has been played by a friend of the user via the cloud gaming system 104. In operation 204, the user 116 may begin to play the game during a specific session of gameplay. During the gameplay, the user may decide that he or she wishes to generate a coaching session for a particular point in time in the gameplay. For instance, the user may be playing the game illustrated in FIG. 1, which may be a driving game.

The user may decide that a particular part of the driving game is tricky and others would enjoy or benefit from knowing how to take certain turns or make certain maneuvers to achieve a certain level or points or trophies. In operation 206, a gain timestamp is recorded for when the user decides to record a coaching session. The timestamp, as mentioned above, can identify a point in time during the gameplay. Because different users arrived at certain points in the gameplay at different times, the identification data is not necessarily only game time or playtime, but the timestamp can identify metadata that describes where in the game the users are playing, such as the level of game, the scene being rendered, again objects illustrated in the game scene, other users in the game scene, maneuvers made in the game scene, and other identifying data that can be used to identify the timestamp, e.g., the point in time when the user desires to make a coaching session. For example, the user may select a button on the controller 118, and input on a keyboard, a touch on a touchscreen, a selection of a GUI, or other input indicative of a desire to make a coaching video of a specific coaching session.

Thus, if the user selects to begin a coaching session, the gameplay being driven by the user is recorded. In one embodiment, in addition to recording the gameplay, the user's voice may be recorded which can include the coaching information and coaching commentary associated with the gameplay being shown and played. In another embodiment, in addition to recording the gameplay, an image or video of the user can also be taken and recorded. The recording of the user can be to show the user playing the game session, such as in a side window, embedded window, a user interface, or superimposing the image of the user over certain gameplay in the form of an add-on.

In operation 208, the recording of the coaching session for the game can be initiated. In one embodiment, a video camera of the client device or located with the client device or connected to the client device or integrated on the client device can be used to capture video of the user. In one embodiment, a camera connected to the client can capture video of the user, e.g., where the user is located. The video can be streamed to the server of the cloud gaming system 104. At the server, the received video can be saved to define a recording, e.g., a coaching video. In another embodiment, the camera at the client location can capture the video and when complete, a file with the entire video can be sent to the server. The server can then sync the video file with the captured gameplay recording, which was recorded at the server. Therefore, the video captured of the user providing the coaching will need to be transferred to the server, either by streaming or in packets or in file(s), and then the server can associate the video of the coach with the recorded gameplay. In one embodiment, initiation to record the gameplay and the video of the coach can start upon or after a user activates a coaching mode. In one embodiment, the recorded gameplay video and the recorded coaching video will define a coaching session. In one configuration, when the coaching session is played or started, it may include an introduction, which identifies the player that created the video, or a picture of the coach, introductory music, introductory text, audio, commentary, or images.

The coaching session is saved in operation 210, e.g., after the coaching session is complete. The coaching session can be saved, for example, to the coach database 110. In operation 212, it is determined whether the user that made the coaching session desires to continue playing the game.

For instance, the user may wish to continue playing the game while not participating in a coaching session. If the user wishes to continue playing, the operation moves to gameplay 204. If the user has finished gameplay of the specific game that the coaching video was created for, the operation can move to decision 214. In decision 214, it is determined whether the user wishes to play another game. If the user wishes to play another game, the user can then select a different game 202. Otherwise, the user may be done. In another embodiment, a user may decide to make a coaching session after the user has finished playing a portion of the game. In this example, a portion of the game is selected by the user, e.g. in the form of a video clip of previously played interactive content. In another embodiment, previously saved clips can also be accessed by the user, in order to associate a coaching video with the previously played recorded gameplay. For example, if the user has recorded a game clip of a good gaining session, the user may wish to in this manner, it is possible to identify the location in a game when the game clip was generated so as to identify a timestamp to the gameplay clip, and associate the coaching video thereto.

Accordingly, embodiments of the disclosure enable users that have access to the cloud gaming system 104 to create user generated content (UGC), in the form of coaching videos and clips of gameplay. These coaching sessions, including recorded gameplay and recorded coaching videos, can then be posted by the user to the database of coaching sessions. Posting the coaching sessions will simply add the coaching session to the coach database 110, such that the coaching sessions can be accessed in the future by other players if those players are playing that particular game and request coaching for content related to the timestamp for which the coaching video was created. Specifically, as described with reference to FIG. 2, the user may have paused again to access coaching videos because the user needs help progressing through the specific point in time of the game. If that specific user was requesting help for a location or part of the game that relates to previously generated coaching sessions, coaching sessions that relate to that point in time or timestamp, can be obtained and provided as options to the user for viewing.

Figure 4:
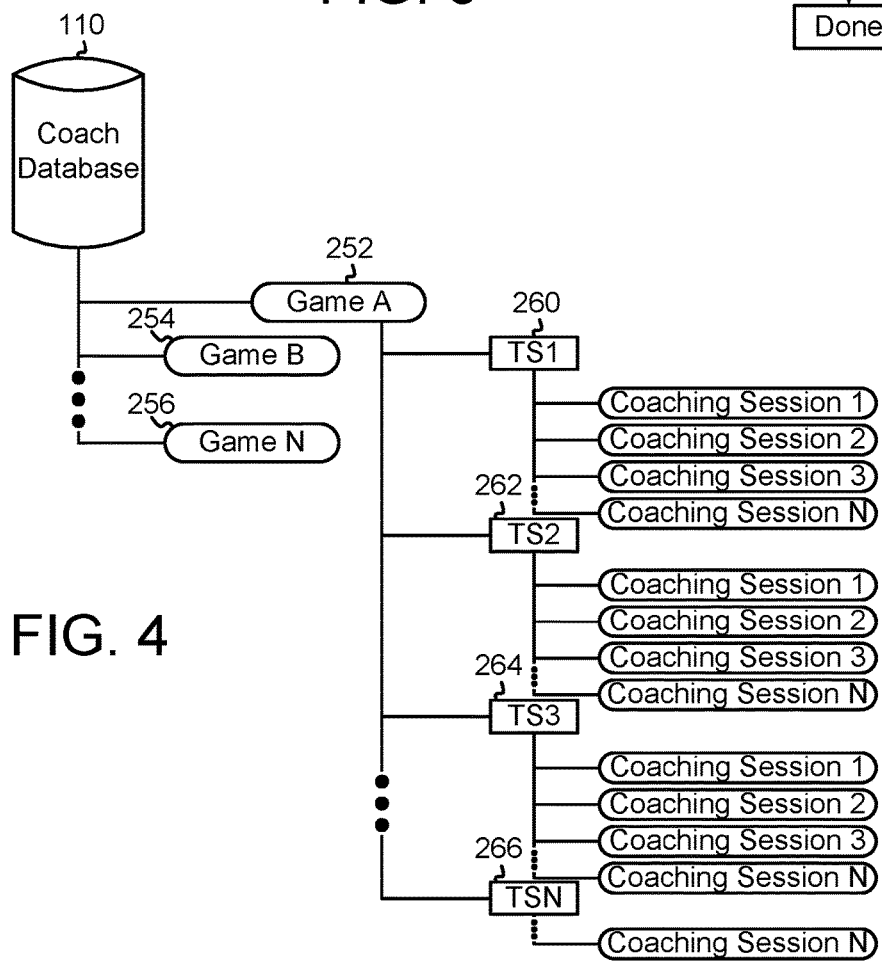
FIG. 4 illustrates an example of database, and the logical association of coaching sessions to specific games, based on timestamps.

FIG. 4 illustrates an example of database 110, and the logical association of coaching sessions to specific games, based on timestamps. In this example, coach database 110 may be tracking a plurality of games, such as game A 252, game B 254, and game N 256. For illustration purposes, game A 252 is shown having a plurality of timestamps (TS1 . . . TSN). These timestamps can represent point in time in the interactive video game A, which helps to identify coaching sessions that may have been created and posted by other users. For illustration, timestamp TS1 260 may have coaching sessions 1, 2, 3 . . . N. Timestamp TS2 262 may have coaching session 1. Timestamp TS3 264 may have coaching sessions 1 and 2. Timestamp TSN 266 may have coaching sessions N. Accordingly, it should be understood that timestamps are not necessarily fixed to a very specific point in time, but can be encompassing of a portion of content that relates to specific scenes, content, or a range of time or scenes in which the coaching sessions that include coaching videos were posted. For example purposes, if the video game was a driving video, and TS1 related to making a turn along a particular road, TS1 can be related to scenes that encompass that road, and or content slightly before the turn, or content slightly after the turn.

For this reason, it should be understood that the timestamps do not have to be exact, but should define a range of time or content that relates to the interactivity or scenes or objectives or content interacted with when the coaching session including the coaching videos were posted. Still further, it should be appreciated that some coaching videos have different links in time, and therefore the timestamp can encompass a range in time or scenes that may be present in the recorded gameplay that relates to the recorded gameplay and/or recorded coaching video.

Figure 5:
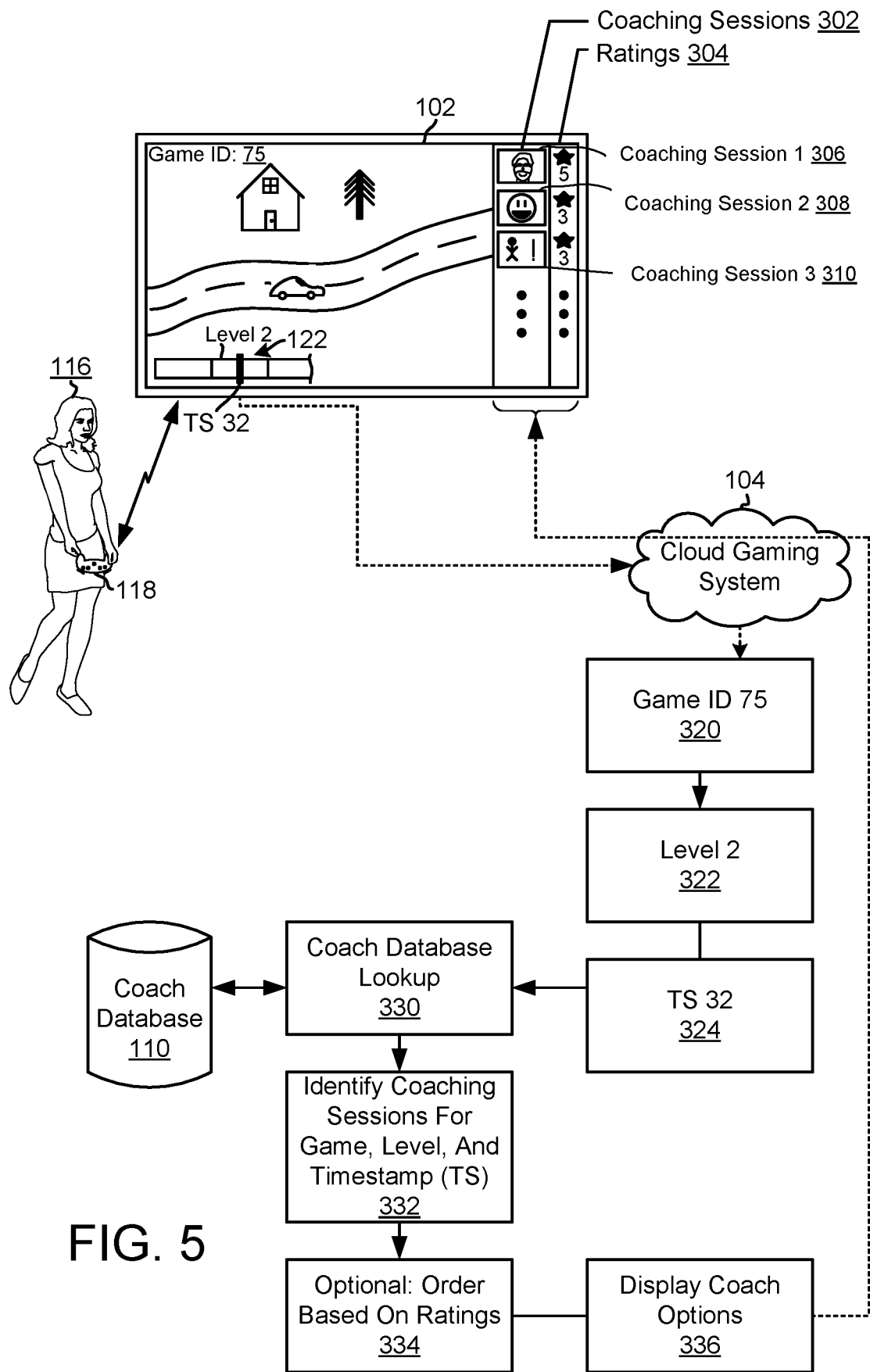
FIG. 5 illustrates an example of user playing a game on a display, which is interfaced with cloud gaming system.

FIG. 5 illustrates an example of user 116 playing a game on a display 102, which is interfaced with cloud gaming system 104. In this example, the user is playing the driving game, which may be identified with a game identifier (ID) 75. The game identifier is provided here in simply as an example, and the game identifier can be represented with any type of data, alphanumeric codes, titles, coding, digits, or combinations thereof. If the user 116 selected or requested coaching videos for the point in time in the gameplay, this request would be sent to the cloud gaming system 104.

Cloud gaming system 104 would then process the request to identify the game in operation 320, the level in the game in operation 322, and the timestamp that identifies the point in time or level or seen that the user is requesting coaching assistance for. In operation 324, is illustrated that the timestamp is TS32, for discussion purposes. In some embodiments, the cloud gaming system 104 will simply identify the timestamp, which will retrieve metadata to automatically identify the level and the game that is currently being played. In other embodiments, the cloud gaming system already understands and knows what the game is so the game ID need not be processed and neither does the level information.

The timestamp data should be provided, which provides information of where the user is playing in time, or scene, or action, or level, or interactivity, or phase. In operation 330, a coach database lookup is performed. The coach database lookup is a call to the coach database 110. In this operation, a search is made to identify previously posted coaching sessions that may relate or are proximate to the timestamp 32. In operation 332, the cloud gaming system will identify coaching sessions for the game, the level, and the timestamp that was received when the user selected or requested coaching. In operation 334, the coaching sessions that are identified or found can be optionally ordered based on ratings by other users. For example, the coaching session could have been retrieved previously and viewed by other users. When other users viewed the coaching sessions, users could rate the coaching sessions based on any number of factors, including their subjective opinion as to usefulness, strength, entertainment value, etc.

Therefore, by allowing other users to rate the user-generated coaching sessions, not only are relevant coaching sessions automatically found for the user for specific parts of the video game, but also higher-rated coaching sessions can be identified to the user so as to avoid viewing or selecting coaching sessions that may not be useful. In operation 336, the coaching options are displayed to user 116. As shown, coaching sessions 302 can be aligned in a user interface window area. This may include posting images of the coaches that provided the coaching sessions. In some embodiments, avatars may be used to identify the coaches. In some embodiments, images of the gameplay can be used to identify the coaches, which will also show relationship to the current game state for which coaching was requested. In still another embodiment, a ratings window 304 can be provided, to identify a rating level for the specific coaching sessions.

In the specific example, 3 coaching sessions were identified, such as coaching sessions 306, 308, and 310. As illustrated, various ways to show the ratings 304 can be provided. In this simple example, stars are shown to identify that the coaching session 13 has 5 stars, while coaching sessions 2 and 3 each have 3 stars. It should be understood that the way in which the coaching sessions are presented to the user as options of coaching sessions can vary depending on the implementation. In some embodiments, instead of a vertical coaching window, the coaching options can be provided in a grid, or in a horizontal bar, or on a left panel, or along the top panel, or can be surfaced as an overlay over the gain content. Broadly speaking, so long as the user 116 is provided with coaching options to select from, the way in which the coaching options are presented can be customized.

FIG. 6 illustrates an example of a recorded gameplay 350 and a coaching video 352 illustrated in screen 102. As shown in FIG. 5, coaching session 1 illustrated option 306 as highly rated. They example of FIG. 6 shows the example presentation of the coaching session 1, which shows the coaching video 306, which was recorded of the player that created the coaching video. The recorded gameplay 350 is also illustrated, which shows the way in which the coaching video moves the car from point A, point B, point C, and point D along the road. Maneuvers, turns, special motions, and other inputs provided to the user interface and/or controller can also be shown, as the coaching video can allow the user to speak and discuss why and how certain moves, inputs, and gestures are made while the specific game portion was played, as it relates to the video game that the user requested coaching for.

In this example, the user can also be provided with a toggle stick 348 that would allow the user to toggle along a timeline 346, so as to slow down and move pause or fast-forward to different portions of the recorded gameplay. When the recorded gameplay progresses, the coaching video is synchronized so as to provide the coaching information while the gameplay is in progress. In one embodiment, if the user that watches the video likes the video, the user can rate the video higher or lower and graphical inputs 304b, which may impact the rating stars in 304a. In some embodiments, the coaching video can also be provided with text comments 340, which may be text comments provided by the user that created the coaching video. These text comments 340 can also include images, pictures of the controller, pictures of the gameplay scene, and other comments that would assist the user who would be playing the game after the coaching video ends. In still other embodiments, after the video is shown or during, users can provide reviews in section 342, which can then be associated with the coaching session 1.

In this manner, other users viewing the coaching video can provide other assistance to other users that may be later viewing the coaching video. This other assistance may be clarifications, tips, pointers, or commentary. In one embodiment, a graphical user interface (GUI) may be provided to allow the user to select 354, which would take the user back to live gameplay. As mentioned earlier, after the user has viewed the recorded gameplay and coaching video, the user may be taken back to the select point 124, or slightly before that point so that the user can resume gameplay. Resuming gameplay would then be made with the user having knowledge as to how that particular portion of the game would be played, since the user had just finished watching a coaching video.

In another embodiment, the coaching session shown in FIG. 6 may also be shared with other users. Sharing can be through a control of an input device interfaced with the cloud gaming system, or can be via a third party social network. For instance, the recorded game play and the associated coaching video can be shared to a third part social network, e.g., as a post to a social stream. In some embodiments, this allows users to post the game play with his or her friends, and if friends which to experience the gameplay, other users can link back to the cloud gaming system. In one embodiment, the cloud system enables generation of a presentation of the recorded gameplay and the coaching video. An example of the presentation is shown in FIG. 6.

The presentation, in one example, shows the recorded gameplay in action and the user providing instruction regarding the game play. The recorded gameplay is rendered on a first portion of the screen and the coaching video being rendered on a second portion of the screen. In some embodiments, the sizes of the first and second portions may be modified. For instance, the coaching window may be enlarged and the recorded gameplay may be reduced or vice-a-versa. In one embodiment, a rating control 304b is integrated in association with the coaching video. In still other embodiments, comments regarding the coaching video in associating with the coaching video are integrated. Such prior comments are visible, and new comments are enabled to be entered so that the new comments are associated to the coaching video. In addition to comments, some reviews may be provided. In some configurations, the reviews and comments may be filtered using access control lists (ACLs), so that only certain friends or users can view such specific comments.

In one embodiment, the coaching video can also have the option to toggle to detailed views of the controller, showing button presses, two hand presses, rapid inputs, sliding, touching, tapping, gestures, motions, and/or combinations thereof. Thus, the video can have toggles that the user can choose, so as to view the controller or view the coach holding the controller. In either configuration, the ability to toggle between views allows users to find coaching formats that are best aligned with how they best follow and can understand the game input process.

Figure 7:
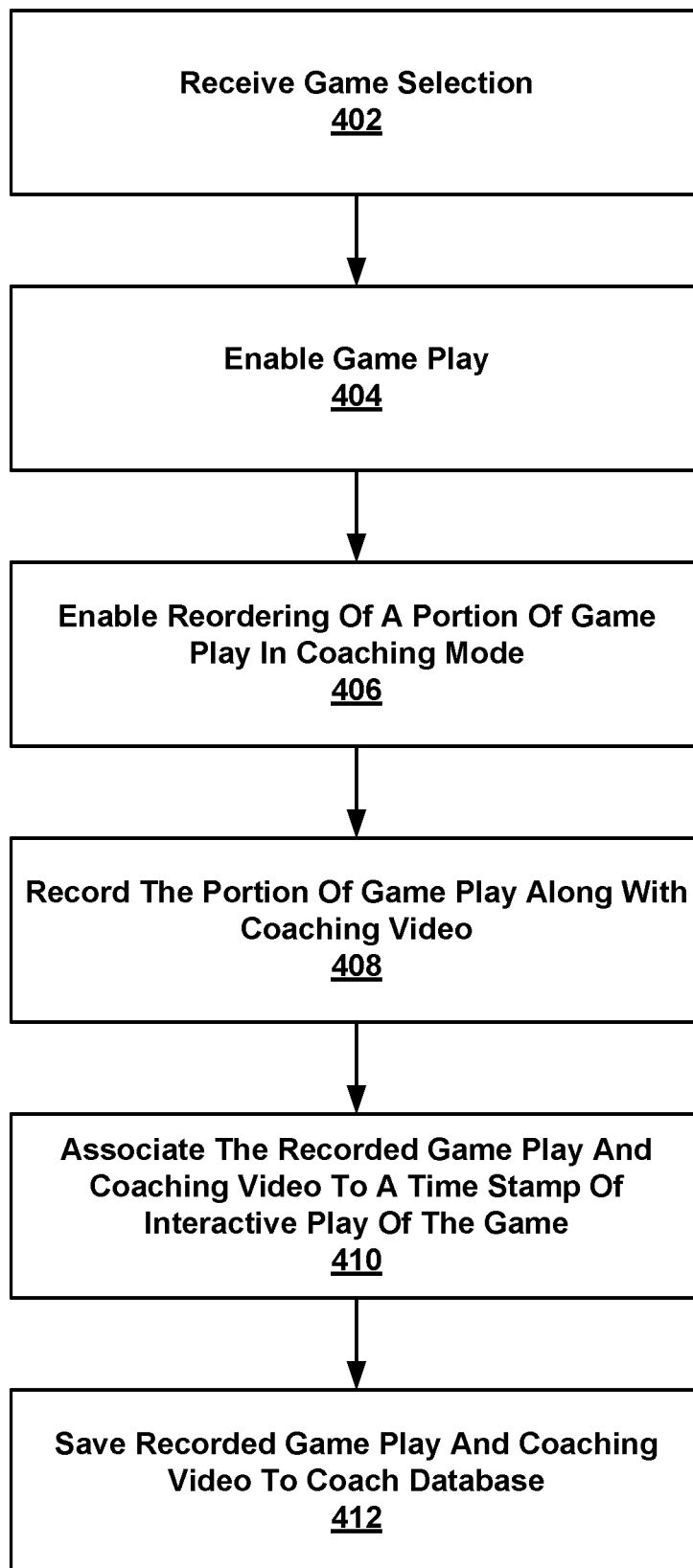
FIG. 7 illustrates one example flow diagram, associated with generating coaching videos.

FIG. 7 illustrates one example flow diagram, associated with generating coaching videos. In operation 402, game selection is received by the cloud gaming system 104. In operation 404, gameplay is enabled by the cloud gaming system 104. Operation 406 will enable recording of a portion of the gameplay in a coaching mode. During the coaching mode, the gameplay is recorded along with a coaching video in operation 408. In one embodiment, a camera local to the player can be directed at the player so as to capture the player's face and/or hands and/or controller. In some embodiments, the coaching need not include video, but can simply include a voice file, which can be recorded by microphone that the player speaks into. In still other embodiments, the coaching can be provided by simply adding text comments. In operation 410, the recorded gameplay and the coaching video are associated to a timestamp of interactive play of the game. As noted above, the timestamp refers to the point in time or the interactivity or the content that the user is playing when the recorded gameplay and or coaching video were created. In operation 412, the recorded gameplay and coaching video are saved to the coach database 110.

Figure 8:
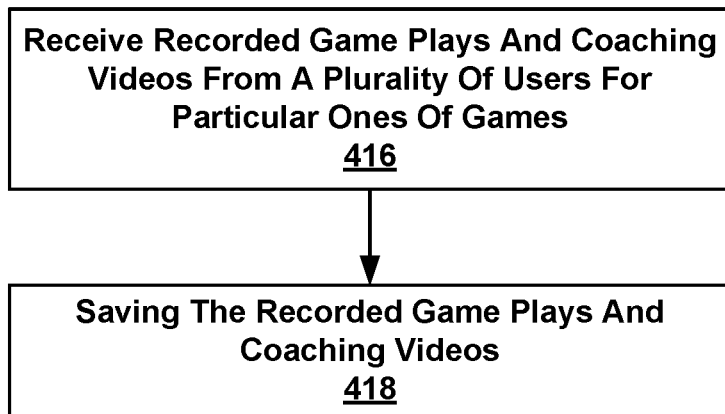
FIG. 8 illustrates an example of operations performed by the cloud gaming system.

FIG. 8 illustrates an example of operations performed by the cloud gaming system 104. Cloud gaming system 104 will receive recorded gameplays and coaching videos from a plurality of users for particular ones of the games. This process will occur over time in operation 416, which will grow the coach database 110, and provide more options of coaching sessions to users that later wish or request coaching information for specific game interactivity. As noted, in operation 418 the recorded gameplays and recorded coaching videos will be saved and indexed based on the timestamps.

Figure 9:
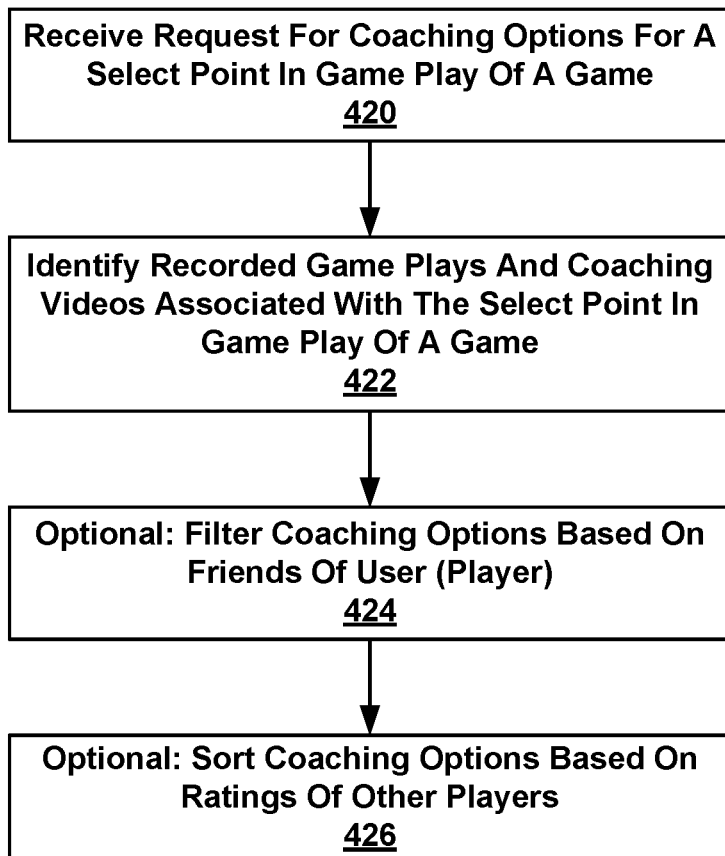
FIG. 9 illustrates an example of a user who may be requesting coaching during gameplay.

FIG. 9 illustrates an example of a user who may be requesting coaching during gameplay. In operation 420, a request for coaching options is received by the cloud gaming system for a select point in a gameplay of a game. In operation 422, recorded gameplays and coaching videos are identified as associated with the selected point or proximate gameplay location to the selected point. In operation 424, optional filtering can be made with the filter coaching options based on friends of the user (player). For example, some users may only wish to view coaching videos from specific friends, and those coaching videos can be identified ahead of other coaching videos from other users. In some embodiments, a social network may be accessed, such as via an API to identify friends of the user. In another embodiment, a user can pre-identify specific friends or people that they wish to retrieve coaching videos from. In some embodiments, certain high-ranking coaches or popular coaches can be identified in the selection list for the user, so as to allow the user to select from popular coaches. In still other embodiments, a user may type in the name of the coach that they wish to find, which could identify a plurality of coaching sessions posted by that specific coach. In that scenario, the user can view any number of coaching videos for different points in time and different games.

In operation 426, it is also possible to sort the coaching options based on ratings received from other players. If certain coaches provide good coaching feedback, those coaches may be rated higher, and optionally can be displayed more often to users. Accordingly, it should be understood that the methods described herein enable for dynamic posting of coaching videos associated with specific content, and also dynamic retrieval of specific coaching videos based on where in a particular game the user is playing and requesting coaching from. This mechanism utilizes processes of the cloud gaming system, which can optimize the indexing of gaming sessions, coaching sessions, posted gaming sessions, timestamp association, and retrieval.

These operations form technical operations requiring multiple servers and/or execution platforms to enable quick access to databases and presentation of content to remotely located users. As mentioned in various locations herein, cloud gaming can also include the operations of compression utilizing any number compression techniques. The compression techniques may use standard encoders, which would then allow the standard decoders on client devices to access and play the video games. The management of the video games and distribution can include a number of data centers, direction servers, quality of service testers, direction and redirection to lower latency data centers, and management of the coaching video library, which is in the coach database 110. It should also be understood that these operations and tasks will utilize special purpose computers that are designed for streaming and low latency due to the remote execution of games, and the delivery to the client devices.

Figure 10:
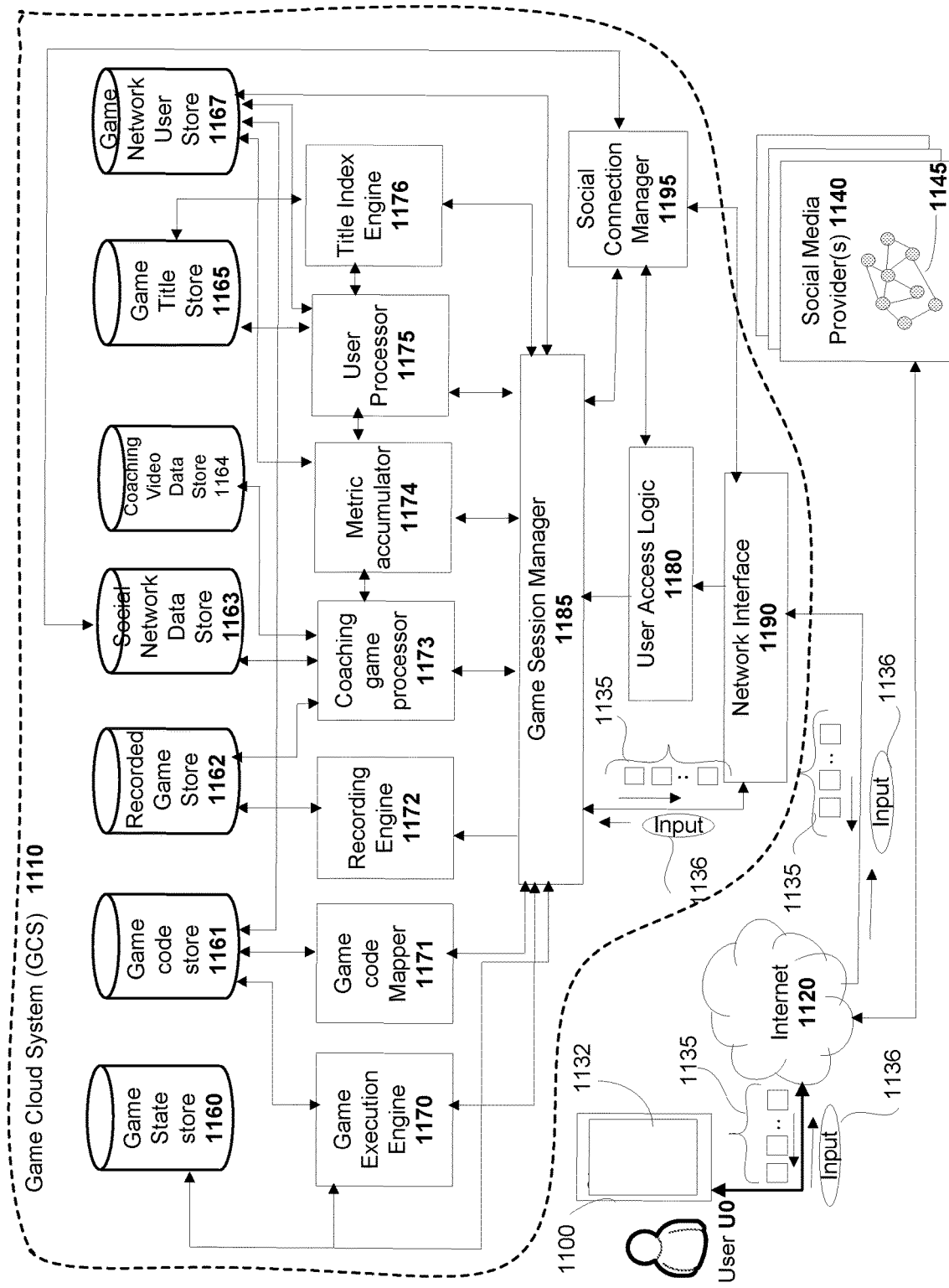
FIG. 10 illustrates a simplified block diagram of a game cloud system that may be used to managing execution and sharing of videos and game clips, in accordance with an embodiment of the disclosure.

FIG. 10 illustrates a simplified block diagram of a game cloud system 1110 that may be used to managing execution and sharing of videos and game clips, in accordance with an embodiment of the disclosure. In one embodiment, the cloud gaming system 1110 may be defined by multiple servers that are part of a datacenter, and are configured to execute games or media that can be played remotely by connected users. The servers can be defined by general purpose servers and special purpose servers, which are networked game consoles. In the case of networked game consoles, a data center can be defined by multiple racks of game consoles, which may be configured to execute certain games and serve a number of connected users. In some cases, certain game consoles are pre-assigned to specific games, and specific numbers (e.g., one or more) users can be assigned to said game consoles. The server infrastructure is then designed to enable execution of games and encoding (e.g., compressing) content sent to the remote user device. The remote user device will then decode data and display the interactive content on a display of a client, used by the remote users. Similarly, user input, e.g., such as controller input, is sent back to the server to enable driving the interactivity of the game. In a broad sense, cloud gaming includes processing the game execution on a remote server of a datacenter and presenting the audio and video output on the remote client. When bandwidth between the client and the server is at some minimum level, and delays are less than 300 milliseconds, the interactivity presented on the screen of the remote client is as if the content were being executed locally on the client. In some embodiments, the game cloud system 1110 may include a plurality of virtual machines (VMs) running on a hypervisor of a host machine (or simply a host), with one or more virtual machines configured to execute a game processor module utilizing the hardware resources available to the hypervisor of the host.

Some examples of game client device include a personal computer (PC), a television, a home theater PC, general purpose computer, mobile computing device, a smart phone, a tablet, or any other types of computing devices that can interact with the game server over the internet to execute a video game. A such, the game server may be any type of server computing device available in the cloud, including a virtual machine executing on a host, and accessed remotely through the Internet 1120.

In some configurations, when a user logs into the cloud game system 1110, the user may be presented with an option to designate the type of client device through which the user is accessing the cloud game network. In one embodiment, a series of client device options are presented from which the user may select one corresponding to his/her client device. Similarly, the user may also be presented with an option to designate the type of controller device they will use to play a video game. In one embodiment, a series of controller options can be presented to the user, from which the user may select to designate a controller type corresponding to their controller hardware.

In other embodiments, the cloud game system 1110 can be configured to automatically detect the client device type and/or the controller device type. For example, at the time of login, the client device may send information to the game server identifying itself as well as a connected controller device (e.g. in response to a request from the game server). Based on this information, the game server within the game cloud system 1110 may determine an appropriate video game output configuration (e.g., compression, resolution, aspect ratio, etc.) and input parameter configuration to provide a gaming experience optimized for the user's client device and controller device. In one embodiment, a look-up table is employed to determine video game configuration and input parameter configuration based on a detected client device and a detected controller device. These configuration and input parameters are used to generate the pre-defined setup parameters. The setup parameters provide information at the client device to define controls for playing the video game. In addition to the setup parameters, a social media interface may also be provided at the client device to enable social interaction with other users.

Still referring to FIG. 10, various example modules and their interactions with one another are shown. For example, a social media provider 1140, a user device 1100, and the game cloud system 1110 are connected via Internet 1120. Although one user device 100 is illustrated, it is to be understood that in practice, many more user devices may be connected to Internet 1120 to access the services provided by game cloud system 1110 and social media providers 1140.

In one embodiment, game cloud system 1110 includes a plurality of modules that receive and process various data related to managing execution and sharing of recorded gameplays, e.g., coaching videos. In one embodiment, the different modules of the game cloud system 1110 may include one or more execution engines that execute on a game server using data available to the game server. It should be understood that some systems may have more or less of these modules, so this example should not be viewed as limiting to many more implementations that are configured to enable online gameplay.

For example, several execution engines may be used to execute different game and management tasks. Some example engines may include, without limitation, a game execution engine 1170, a game code mapper 1171, a recording engine 1172, a coaching game processor 1173, a metric accumulator 1174, a user processor 1175, a title index engine 1176.

The game cloud system 1110 may further include a plurality of data storage systems to store various data and/or processed data. As shown, without limitation, data stores may include game state store 1160, game code store 1161, recorded game store 1162, social network data store 1163, coaching video data store 1164, game title store 1165, game network user store 1167. A game session manager 1185 may be configured to interact with the game execution engines and the data stores, as well as with social connection manager 1195. The game session manager 1185 is also configured to grant and/or control access to various users, e.g., via a user access logic 1180.

In one embodiment, a user U0, may be accessing the game cloud system 1110 via a user device 1100, which has a specific screen 1132. Input provided by the user can be via a controller, a keyboard, a touchscreen, or any other input. The input 1136 is communicated over the Internet 1120 to the game cloud system 1110. In one embodiment, the input 1136 can be communicated in packets of data that may be compressed and then forwarded to the game cloud system 1110 and received by the network interface 1190. In one embodiment, the network interface 1190 may be associated with a specific server of the game cloud system 1110, a specific game console, or various servers in a data center. The input 1136 is then passed to the game session manager 1185 which provides for the processing of the game logic and return of audio and video packets 1135. The audio and video packets are encoded (e.g. compressed) and forwarded back to the user device 1100, were a decoder of the client device decodes and presents the data back to the screen 1132.

In some embodiments, the system can operate as a hybrid system, wherein social relationships are managed using social graph data 1145 from third party social media providers (via application programming interface (API) accesses or the like). In still other embodiments, the game cloud system 1110 can manage its own social network data, which can include lists of users with user accounts for the game cloud system 1110, and also relationships identifying friends that play certain games or interact with each other.

In one embodiment, a user, e.g., user U0, may create a user account and register the created user account with game cloud system 1110. After the user account is registered with game cloud system 1110, game cloud system 1110 may provide a user ID to this registered user account and save the user ID in a user profile associated with the registered user account. In one embodiment, the user profile associated with a user account may be saved in a user database in game network user store 1167.

After logging in, the user can access services provided by game cloud system 1110 via game session manager 1185. For example, game session manager 1185 may inform user processor 1175 of the user login information so that user processor 1175 may record or update the user login information in the user profile associated with this user. User processor 1175 may also communicate with title index engine 1176 to identify game titles associated with the user account. The game titles associated with the user account may be previously purchased by the user, previously played by the user and/or free game titles identified and made available by the game providers. In one embodiment, the game titles associated with the user account may also include game titles associated with a genre defined by the user's interest based on user's prior selection of games. Additionally, the user processor 1175 may identify user data, which includes historical play data, levels achieved in particular games, points accumulated, states of games that are in progress, trophies earned, credits earned, etc.

Game session manager 1185 access game state store 1161 to retrieve saved game state of a last session played by the user (for a selected game), if any, so that the user can restart the gameplay from a previous gameplay stop point. Once the resume or start point is identified, the game session manager 1185 may inform game execution engine 1170 to execute the game code of the chosen game title stored in game code store 1161. After a game session is initiated, game session manager 1185 may pass game video frames (i.e., streaming video data), via network interface 1190 to a user device, e.g., user device 1100.

During gameplay, game session manager 1185 may communicate with game execution engine 1170, and recording engine 1172, to generate or save a recording (e.g., video) of the gameplay or gameplay session as the gameplay processes. In one embodiment, the video recording of the gameplay can include other game related metadata provided and/or captured during gameplay. This additional data can include a video of the user playing the game. For example, this video of the user playing the game may be used to generate a coaching video, which can be processed by a coaching game processor 1173. The video of the gameplay and the video of the user teaching others how to play or detailing action in the gameplay can then be saved to a coaching video data store 1164.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the embodiments described herein may be executed on any type of client device. In some embodiments, the client device is a head mounted display (HMD).

Figure 11:
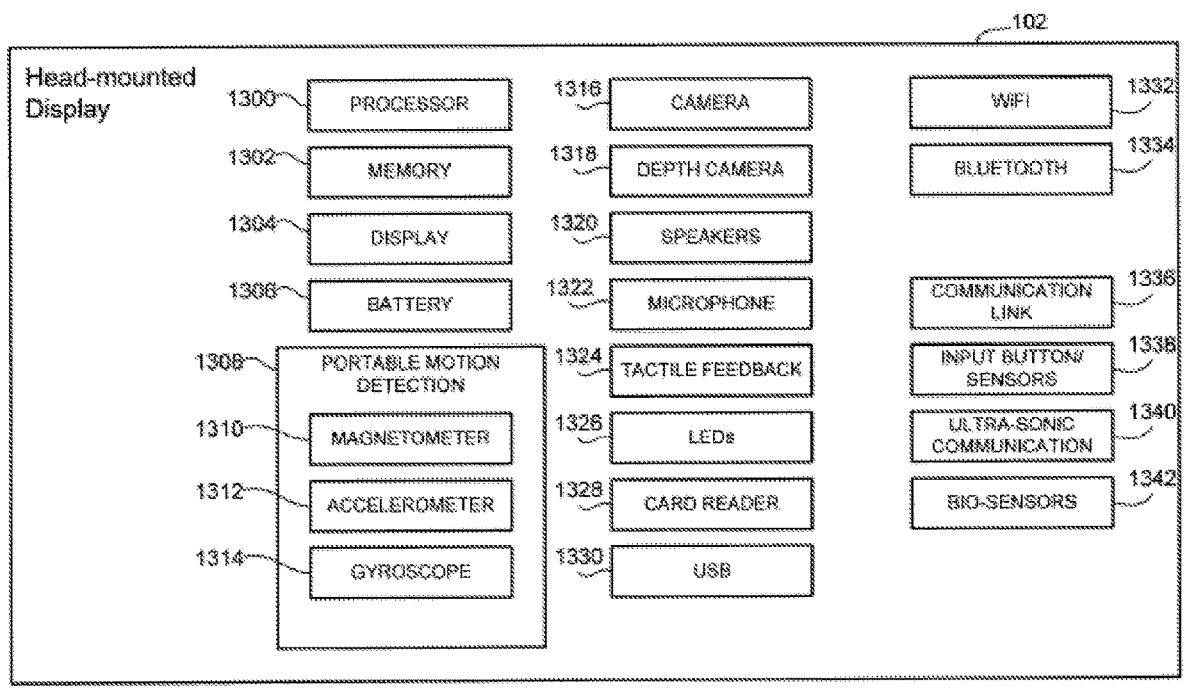
FIG. 11, a diagram illustrating components of a head-mounted display is shown, in accordance with an embodiment of the invention.

FIG. 11, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 12:
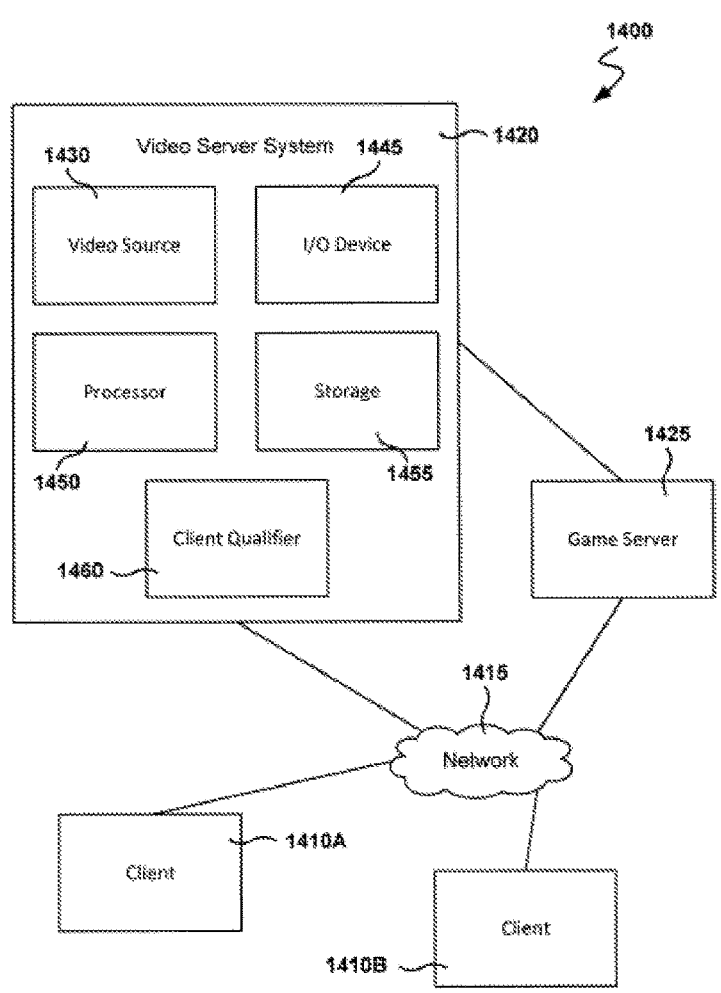
FIG. 12 is a block diagram of a Game System, according to various embodiments of the invention. Game System is configured to provide a video stream to one or more Clients via a Network.

FIG. 12 is a block diagram of a Game System 1400, according to various embodiments of the invention. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 1420 frames per second. Although higher or lower frame rates are included in alternative embodiments of the invention.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect gameplay. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for enabling generation of coaching videos for games that are streamed to clients from a cloud gaming system, comprising, executing gameplay of a game at a server of the cloud gaming system, the execution of the gameplay being directed from a client device that is connected to the server, the execution of the gameplay includes streaming video and audio to the client device for presentation on the client;

enabling a coaching mode, the coaching mode when activated starts to record the gameplay at the server and capture of a video of a user at the client, the captured video of the user being received by the server and saved at the server to create a coaching video, said coaching video includes a view of a face of the user while the user provides commentary related to how a specific game portion of the gameplay is played;

generating a timestamp based on metadata that identifies a place in content interactivity in the game and actions occurring in the place in content, the place in content interactivity includes maneuvers made in the gameplay for which the coaching video is related, the recorded gameplay and the coaching video defining a coaching session;

enabling posting of the coaching session to a coach database, the coach database being accessible by the server when another user requests coaching assistance for the game;

the server of the cloud gaming system is configured to automatically identify one or more coaching sessions for a select point in gameplay for the game in response to the another user pausing the game, said select point in the gameplay is at a point in the game where said another user requests coaching help for the game and causes the cloud gaming system to access the coach database to perform the automatic identification of the one or more coaching sessions at the select point in the gameplay, the select point is identified by the server of the cloud gaming system from game state of the gameplay by the another user when the coaching help is requested by the another user, the game state includes action in the gameplay by the another user;

rendering a selected coaching session from the one or more coaching sessions, the rendering causes the selected coaching session to be rendered at a point in time that is substantially at the select point in gameplay for the game.

2. The method of claim 1, wherein the coaching mode, when enabled, causes generation of the timestamp to enable indexing of the coaching session to the game.

3. The method of claim 1, wherein the place in content interactivity is a portion of the game.

4. The method of claim 1, further comprising,
generating a display window providing options of the one or more coaching sessions.

5. The method of claim 4, wherein each coaching session is provided with an associating rating, the rating being produced based on ratings of the coaching session by users of the cloud gaming system.

6. The method of claim 1, wherein the game is provided with a game identifier by the cloud gaming system, wherein at least the game identifier is used for one or more database lookups to a coach database, the database lookups identifying one or more coaching sessions for the select point in the game play for the game by the another user.

7. The method of claim 1, further comprising,
filtering the one or more coaching sessions, the filtering using social graph data to identify friends of the user.

8. The method of claim 7, wherein the social graph of the user is accessed from a social network via an application programming interface (API) call, the API call being triggered by a server of the cloud gaming system.

9. The method of claim 1, further comprising,
generating presentation of the recorded gameplay and the coaching video, the presentation showing the recorded gameplay in action and the user providing instruction regarding the game play, the recorded gameplay being rendered on a first portion of the screen and the coaching video being rendered on a second portion of the screen.

10. The method of claim 9, further comprising,
integrating a rating control in association with the coaching video.

11. The method of claim 9, further comprising,
integrating comments regarding the coaching video in associating with the coaching video, such that prior comments are visible, and new comments are enabled to be entered so that the new comments are associated with the coaching video.

12. The method of claim 1, wherein the game is provided with a game identifier by the cloud gaming system, wherein at least the game identifier is used for one or more database lookups to the coach database, the database lookups identifying the one or more coaching sessions for the select point in the gameplay for the game.

13. The method of claim 1, wherein the automatic identifying of one or more coaching sessions avoids searching by the user to identify one or more coaching sessions for the select point.

14. The method of claim 1, wherein the automatically identifying the one or more coaching sessions is responsive to the another user providing input to pause the game.

15. A method for operating gaming operations via a cloud gaming system, comprising,
enabling gameplay of a game to a user that is registered to play games via the cloud gaming system, the cloud gaming system configured to execute the game on a server of the cloud gaming system in response to input control received from a client device of the user, the client device of the user having an internet connection to the server of the cloud gaming system and the server of the cloud gaming system is configured to send a stream of audio and video in response to execution of the game, the audio and video stream being rendered on a screen associated with the client device;
pausing the gameplay of the game;
accessing automatically by the server of the cloud gaming system in response to the pausing the gameplay a coach database, the access to the coach database includes a request by the server for coaching sessions for the game in association with a select point in the game, the select point in the game is identified by the server of the cloud gaming system for said automatic accessing by the pause in the gameplay by the user to use a coaching mode, the server uses game state from the gameplay by the user to identify the select point when the pause of the gameplay of the game occurs, said select point in the game is at a point in the game where the user pauses the gameplay;
presenting coach options to the display screen of the client device, the coach options include one or more coaching sessions that relate to the select point in the game accessed by the server of the cloud gaming system;
receiving a selection to render a coaching session from the one or more coaching sessions on the display screen of the user, the rendering of the coaching session causes the coaching session to be rendered approximately at the select point in the game, and each of the coaching sessions includes a recorded gameplay and a coaching video from a user that created the coaching session; and
enabling resume of gameplay of the game after rendering of the coaching session;
wherein one or more coaching sessions are generated by other users of the cloud gaming system, and the cloud gaming system acts to index the coaching sessions to timestamps, and each timestamp is based on metadata that relates to where in a game the coaching session relates, wherein the metadata identifies a place in content interactivity in the game and actions made during the gameplay,
wherein said timestamp and information in the actions made during the gameplay enables presenting the coach options for the select point in the game that relate to the actions made;
wherein the coaching video includes video of controller inputs made to control the maneuvers made in the gameplay of the game, wherein the controller inputs have a direct relation to the maneuvers made in the gameplay.

16. The method of claim 15, wherein the coaching video includes a ratings input controller, the rating input controller enables ratings to be provided to the cloud gaming system and shared with other users wishing to view or make selections for specific ones of the coaching sessions.

17. The method of claim 15, further comprising,
generating presentation of the recorded gameplay and the coaching video, the presentation showing the recorded gameplay in action and the user providing instruction regarding the game play, the recorded gameplay being rendered on a first portion of the screen and the coaching video being rendered on a second portion of the screen.

18. The method of claim 15, further comprising,
filtering the one or more coaching sessions, the filtering using social graph data to identify friends of the user.

19. The method of claim 18, wherein the social graph of the user is accessed from a social network via an application programming interface (API) call, the API call being triggered by a server of the cloud gaming system.

\* \* \* \* \*